(12) United States Patent
Rousselin et al.

(10) Patent No.: US 9,008,054 B2
(45) Date of Patent: Apr. 14, 2015

(54) RESOURCE MANAGEMENT FOR A MOBILE TELEPHONE TERMINAL

(71) Applicant: ST-Ericsson SA, Plan-les-Ouates (CH)

(72) Inventors: Samuel Rousselin, Rennes (FR); Yann Le Gal, St. Jacques de la Lande (FR)

(73) Assignee: Ericsson Modems SA, Le Grand-Saconnex (CH)

( * ) Notice: Subject to any disclaimer, the term of this patent is extended or adjusted under 35 U.S.C. 154(b) by 0 days.

(21) Appl. No.: 14/052,141

(22) Filed: Oct. 11, 2013

(65) Prior Publication Data

US 2014/0036891 A1 Feb. 6, 2014

Related U.S. Application Data

(63) Continuation of application No. 13/375,366, filed as application No. PCT/EP2010/057742 on Jun. 2, 2010, now Pat. No. 8,583,130.

(30) Foreign Application Priority Data

Jun. 2, 2009 (FR) ..................................... 09 53638

(51) Int. Cl.
*H04J 3/00* (2006.01)
*H04L 5/00* (2006.01)
*H04B 15/00* (2006.01)

(52) U.S. Cl.
CPC .............. *H04L 5/0092* (2013.01); *H04B 1/406* (2013.01); *H04B 15/00* (2013.01)

(58) Field of Classification Search
CPC .................................. H04B 15/00; H04B 1/406
USPC .................... 455/450, 67.13, 522, 13.4, 296; 370/337
See application file for complete search history.

(56) References Cited

U.S. PATENT DOCUMENTS

| | | |
|---|---|---|
| 2006/0292986 A1 | 12/2006 | Bitran et al. |
| 2007/0060066 A1* | 3/2007 | Srinivasan ................. 455/67.11 |
| 2008/0119140 A1* | 5/2008 | Maligeorgos et al. ..... 455/67.13 |
| 2008/0233875 A1 | 9/2008 | Desai et al. |
| 2008/0310485 A1 | 12/2008 | Soliman et al. |
| 2009/0028115 A1* | 1/2009 | Hirsch .......................... 370/337 |
| 2009/0088199 A1 | 4/2009 | Nurminen et al. |
| 2009/0135958 A1* | 5/2009 | Rueckriem et al. ........... 375/340 |
| 2012/0093138 A1* | 4/2012 | Ponnampalam et al. ..... 370/336 |

FOREIGN PATENT DOCUMENTS

WO 2008059441 A1 5/2008

* cited by examiner

*Primary Examiner* — Barry Taylor
(74) *Attorney, Agent, or Firm* — Coats & Bennett, PLLC

(57) ABSTRACT

A resource management unit for a mobile telephone terminal, with the terminal comprising radio transmission/reception means for transmitting and receiving radio frequency signals corresponding to bursts of symbols during allocated time slots, and a device able to operate in a first mode and in a second mode, said device interfering less with the transmission/reception of radio frequency signals when it is in the first mode than when it is in the second mode. The resource management unit is able to cause the device to change from one of the first and second modes to the other of the first and second modes during the same time slot.

15 Claims, 3 Drawing Sheets

RESOURCE MANAGEMENT FOR A MOBILE TELEPHONE TERMINAL

This application is a continuation filing of, and claims priority to, U.S. patent application Ser. No. 13/375,366, titled "Resource Management for a Mobile Telephone Terminal," filed Dec. 20, 2011, which is a U.S. National Stage filing of PCT Application PCT/EP2010/057742 (published as WO 2010 139745), titled "Resource Management for a Mobile Telephone Terminal," filed Jun. 2, 2010, which claims priority to French patent application FR 0953638, titled "Gestion des Ressources d'un Terminal de Telephonie Mobile," filed Jun. 2, 2009 and published as FR 2946217.

TECHNICAL FIELD

This invention relates to the field of mobile telephony, particularly the field of Time Division Multiple Access (TDMA) telephony.

TECHNOLOGICAL BACKGROUND

A mobile telephone terminal conventionally comprises a means for transmitting or receiving radio frequency signals in packets known as bursts.

The terminal also comprises various devices, for example an input/output management device, a power supply, a DC-DC regulator, a baseband signal processor, a means of managing the user interface, or other devices which could interfere with the transmission/reception of radio frequency signals.

During operation, these devices can degrade the quality of the radio frequency signals emitted by the radio transmitter/receiver or the data received from them.

One possible approach to avoiding such degradation in quality consists of protecting the radio transmitter/receiver from these interfering devices, by shielding or by having the interfering devices sufficiently distanced from the radio transmitter/receiver.

Another possible approach, known as TDI (Time Domain Isolation), consists of not making use of the radio transmitter/receiver at the same time as the interfering devices, which can then be placed in proximity to each other. This approach enables a higher level of integration. In this approach, the clock of the baseband signal processor is slowed or disabled prior to sending or receiving bursts of radio frequency signals, and the clock is reinstated once the bursts are sent or received.

However, this approach results in reducing the activity of the interfering devices, adversely impacting the features and services provided by such devices. The reduction in activity can be more or less considerable depending on the standard. For example, with the GPRS standard (General Burst Radio Services), the baseband signal processor would be stopped for about 70% of the time.

SUMMARY OF THE INVENTION

A need therefore exists for decreasing the reduction in the activity of the interfering devices, while integrating radio communication quality and resources.

The invention proposes a resource management unit for a mobile telephone terminal, said terminal comprising radio transmission/reception means for transmitting/receiving bursts of radio frequency signals, a synchronization means for providing allocated time slots, with each time slot allocated for transmitting/receiving radio frequency signals corresponding to a burst, and at least one device able to operate in a first mode and in a second mode, this device or devices interfering less with the transmitting/receiving of radio frequency signals when it(they) is(are) in the first mode than when it(they) is(are) in the second mode. The resource management unit is able to cause this(these) device(s) to change from one of the first or second modes to the other of the first or second modes during the same time slot.

Also proposed is a resource management method for a mobile telephone terminal. In this method, during an allocated time slot, the device(s) is(are) caused to change from one of the first or second modes to the other of the first or second modes during the same time slot.

Thus, the device is in the first mode (less interfering) during only a part of the period corresponding to the transmission/reception of a burst, which improves the performance of the device.

The resource management unit can comprise various means for changing from the first mode to the second mode. For example, the unit can comprise means for cutting off a clock, for changing the value of an operating mode bit of the device, for decreasing or increasing the clock frequency of the device, introducing latency time, a means for suppressing or modifying a power source for the device, a means for decreasing or increasing voltage to the device, a spread spectrum means, a means for limiting the spectral content of the device, or other means.

The invention is therefore in no way limited by the form of the means for changing to the first mode.

There can be one or more devices able to operate in two different modes, for example an input/output management device, a power supply, a DC-DC regulator, a baseband signal processing means, a user interface management means, or other devices.

The device, when it is in the second mode (normal operation), interferes with the transmission/reception of radio frequency signals. "Interference with the transmission/reception of radio frequency signals" is understood to mean both the interference affecting the radio frequency transmission/reception and the interference affecting the radio frequency signals transmitted/to be received.

The choice of the moment(s) when the change is made from one mode to another can be made when the management unit is manufactured. This unit, for example a circuit or a chip, can then be arranged to cause a device such as a CPU (Central Processing Unit) to enter the first mode, for example an inactive or standby mode, during a given period within a time slot.

This choice of the moment(s) for changing from one mode to another can be made during assembly with the other components of a mobile telephone terminal in a circuit capable for example of deactivating or slowing certain digital processing means during a period whose duration, beginning and/or end is(are) programmable. The choice can thus be made as a function of the environment of the circuit when it is assembled.

The choice of the moment(s) for changing from one mode to another can be made during the service life of the mobile telephone terminal.

The invention is therefore not limited by the circumstances at the time of the choice of moment(s) for changing from one mode to another. This choice can be made by technical means or by a person.

Advantageously, this choice of the moment(s) for changing from one mode to the other is made in order to satisfy a transmission and/or reception quality criterion, for example in order to satisfy the requirements of a standard such as the 3GPP standard (3rd Generation Partnership Project).

By imposing such a constraint, one can choose the moment(s) for changing from one mode to another, for example so that the consequences of interference caused by the operation of a digital processing means during the transmission/reception of radio frequency signals remain limited.

The moment(s) for changing from one mode to another can be chosen as a function of an estimation of the interference generated in the transmitted or received symbols when operating in the first and/or second mode of the device during the transmission/reception of radio frequency signals corresponding to these transmitted or received symbols. The moment(s) for changing modes are thus chosen as a function of an estimated degradation, to avoid the device operating normally (in the second mode) when such operation could affect the quality of the transmission/reception.

The degradation can be estimated by technical means, for example a radio communication tester, a microcontroller, or a circuit for estimating the quality of the signals sent or received, or by a person.

Advantageously, the device can comprise a means for receiving at least one measured quality parameter value, with the choice of the moment(s) for changing from one mode to the other being a function of this at least one received value. The use of measured data thus allows choosing the periods of normal operation (second mode) and the periods of operating with less interference (first mode), on the basis of objective data.

A measurement step can be carried out, or previous measurements can be used.

For example, one can measure an error rate, such as the BER (Bit Error Rate) measured over a certain number of received bursts, a signal-to-noise ratio or SNR, a phase error measurement such as EVM (Error Vector Magnitude), a strength measurement, and/or an analysis of the spectral content of transmitted or received signals.

The moments for changing from one mode to another can be chosen such that the measured parameters satisfy the requirements of a standard, for example the 3GPP standard.

The measurements can be made during the service life of the terminal. Symbol, block, burst, or other errors can in fact be counted due to a redundancy in or prior knowledge of part of the signal received. For example, a cyclic redundancy check or CRC can be implemented. The duration, start and/or end of the normal periods of operation and the less interfering periods of operation can thus be adapted according to the results of such an error count.

The invention is therefore in no way limited by the circumstances of the measurement, or by the manner in which this measurement is done.

Advantageously, since each time slot is divided into predetermined intervals of time, the moment of changing from one of the first and second modes to the other of the first and second modes can be chosen such that the device operates in the second mode for a period of time comprising one or more of these intervals of time. Each interval of time corresponds in fact to a specific function, for example sending payload data, estimating a channel state, or waiting for the next burst. The period of time of normal operation is therefore chosen such that the device continues to operate normally when a function judged to be non-essential is carried out.

Advantageously, the period of time of normal operation can comprise an interval of time in the time slot intended for the transmission/reception of guard symbols at the beginning and/or end of the burst of symbols corresponding to the time slot.

In fact, as these guard symbols are provided primarily to avoid spectral broadening, they do not carry useful information, so any degradation caused by the normal operation of the device has relatively little effect on the quality of the transmission/reception. By allowing the device to operate normally during the transmission/reception of guard symbols, the active time of the device can be increased while the quality remains constant.

Advantageously, the period of normal operation can comprise an interval of time in the slot allocated for the transmission/reception of tail symbols. The function of these symbols is to mark the start or end of trellis coding, and do not actually correspond to useful information.

Advantageously, the period of normal operation can comprise a portion of an interval of time in the time slot allocated for the transmission/reception of useful symbols. In fact, the coding of the channel can be sufficiently robust that any degradation caused by the operation of the device has no real effect on the decoded data.

Advantageously, the period of normal operation can comprise at least a portion of an interval of time intended for sending a training sequence for channel estimation. When the communication takes place under good conditions, the consequences of any interference in this sequence can be relatively limited.

Alternatively, the period of normal operation can only partially cover one or more intervals of time. A period of normal operation can be chosen that covers only a part of an interval of time, particularly if the channel coding is sufficiently robust so that the data corresponding to all the symbols transmitted/received during this interval of time can be recovered without errors or with an error rate that is below a threshold.

The change from one mode to the other mode can be done during the reception or transmission of a burst. The moment of the change from one mode to the other mode is not necessarily determined solely by the provided synchronization. One can in fact choose a moment for the change as a function of the data received or sent, for example the volume of data received or sent, the type of data received or set (guard interval, training sequence, payload, etc.), or other.

Also proposed is a computer program product stored in a memory of a terminal, for example a mobile telephone terminal, and/or on a removable medium able to cooperate with a reader of this terminal, and/or downloadable via a telecommunications network, wherein it comprises instructions for implementing the method described above when it is loaded into the memory of a processor and executed on this processor.

The resource management unit can be separate from the other digital processing means of the terminal, in particular the baseband signal processing means. For example, the resource management unit comprises a microcontroller in communication with a circuit that integrates the baseband processing means.

The resource management unit, the radio frequency signal transmission/reception means and/or the device can be integrated into one circuit. A circuit is therefore proposed that is intended for a mobile telephone terminal, comprising a device able to operate in the first or the second mode, for example a baseband signal processing means, and comprising the resource management unit described above.

Also proposed is a mobile telephone terminal comprising radio transmission/reception means for transmitting and receiving radio frequency signals corresponding to symbol bursts during respective allocated time slots, a synchronization means, a device able to operate in the first and second mode, and a resource management unit as described above.

Other features and advantages of the invention will be apparent from the following description.

The same references may be used in different figures to represent identical or similar objects.

DETAILED DESCRIPTION OF EMBODIMENTS

Figure 1:
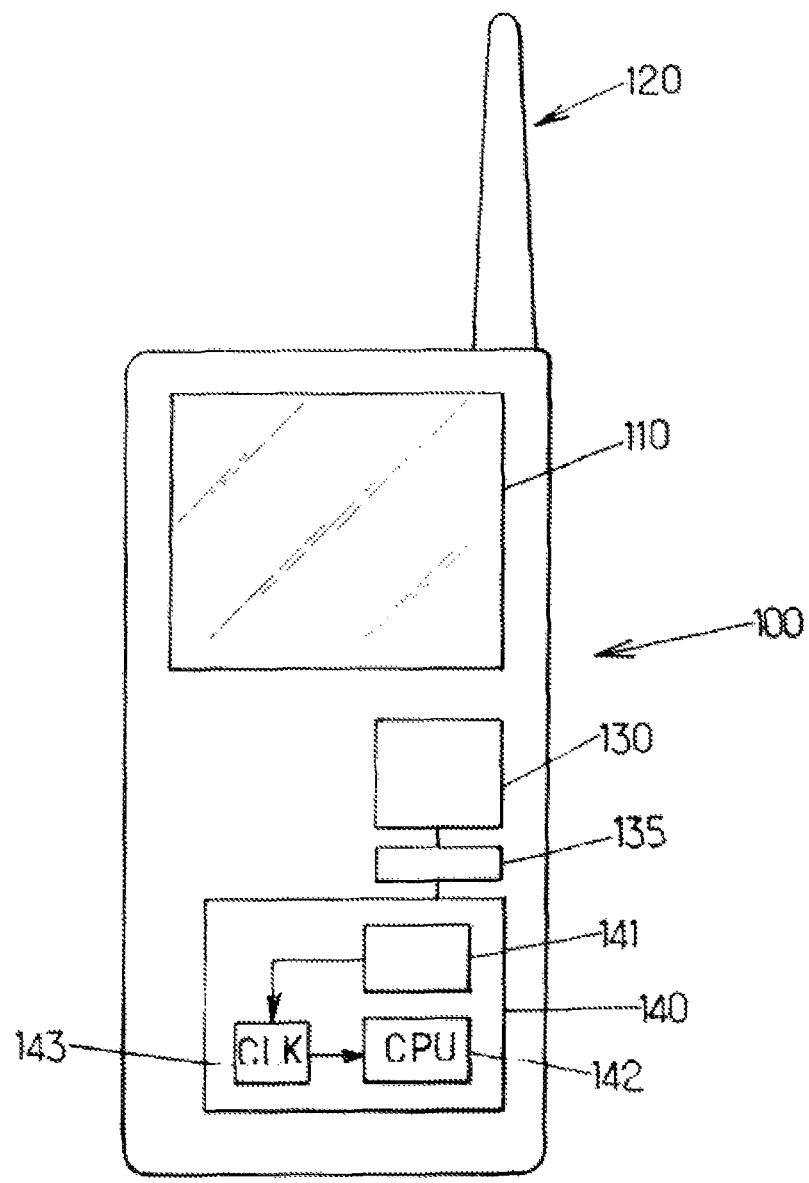
FIG. 1 shows an example of a mobile telephone terminal integrating a processor according to an embodiment of the invention.

FIG. 1 shows a mobile telephone terminal 100 with a screen 110. This terminal is compliant with the GSM (Global System for Mobile Communications) or GPRS (General Burst Radio Service) standard.

The terminal 100 comprises radio transmission/reception means, consisting for example of an antenna 120 and an analog and/or digital circuit 130 connected (directly or indirectly) to the antenna 120. These means 120, 130 allow transmitting and receiving radio frequency signals.

Figure 2:
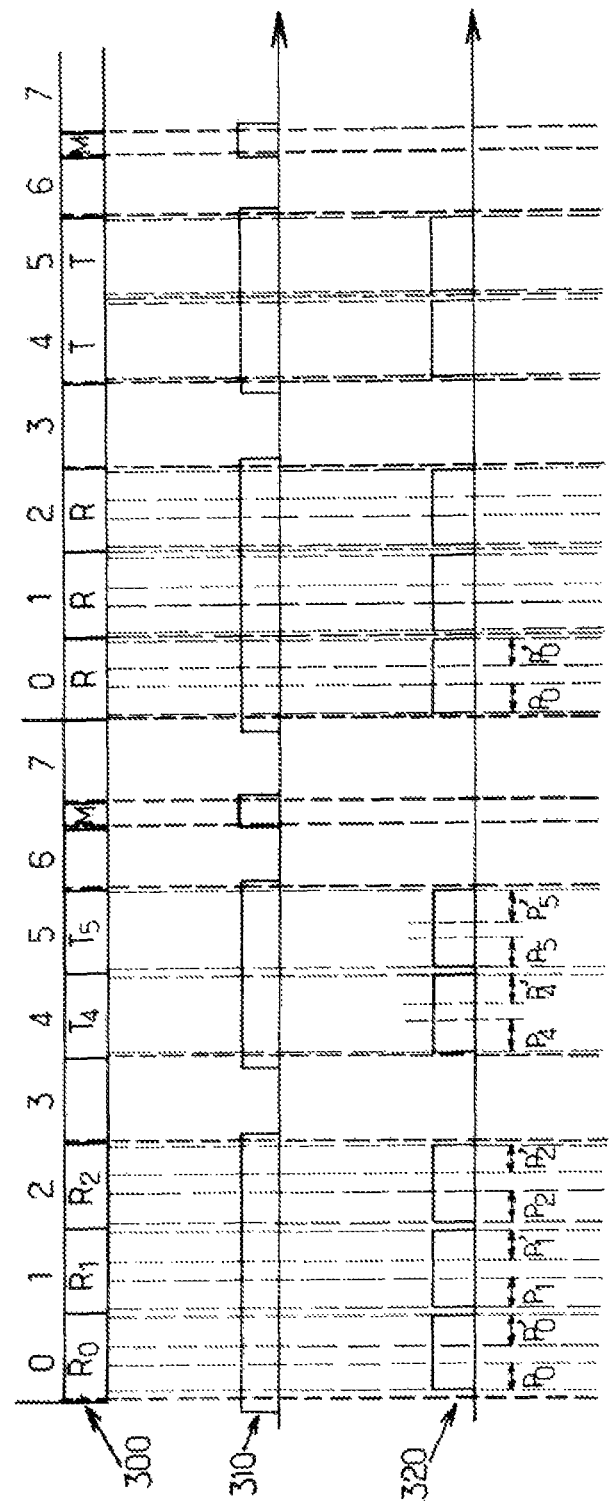
FIG. 2 shows timing charts illustrating an embodiment of the invention.

The terminal 100 uses Time Division Multiple Access, meaning the radio frequency signals are sent or received in a discontinuous manner, in bursts, as represented in the timing chart 300 in FIG. 2.

In this timing chart 300, two frames are represented. The frame period corresponding to one frame is divided into eight frame sub-periods, numbered from 0 to 7 in FIG. 2.

Of these eight frame sub-periods, five comprise a time slot during which the terminal is configured in the mode awaiting the receipt of a burst or is configured to send a burst.

Three slots are allocated for receiving a burst (slots labeled R for Receive) and two slots are allocated for transmitting a burst (slots labeled T for Transmit).

A portion of time, labeled M, is dedicated to monitoring the surrounding radio frequency signals for a given frequency. This portion of time M does not necessarily constitute a time slot, as the corresponding time can be dedicated to listening for signal strength, not to waiting for a burst.

The beginnings and ends of the frame sub-periods and time slots are known after synchronization is performed by the synchronization means. This synchronization means can be integrated in a circuit or a microcontroller, for example the circuit denoted as 140 in FIG. 1.

A buffer 135 is in communication with the circuit 140 and with the circuit 130, to allow temporarily storing data received or to be transmitted, according to methods well know to those skilled in the art.

The circuit 140 comprises a digital processing part 142 for managing the baseband signals, this digital processing part as well as most of the other components of the terminal 100 being well known to those skilled in the art of mobile telephony.

Also conventionally, this digital processing part 142 is synchronized by a clock 143.

The timing chart 310 of FIG. 2 corresponds to a resource management process using the TDI approach. This timing chart shows a signal for deactivating the digital processing part by not supplying the clock signal ("clock gating"). In this approach, the clock is disconnected from the digital processing part for the entirety of each of the five time slots $R_0$, $R_1$, $R_2$, $T_4$, $T_5$.

The digital processing part is also deactivated during a small part of the frame sub-periods preceding and following the time slots $R_0$, $R_1$, $R_2$, $T_4$, $T_5$ (sub-periods 3, 6 and 7), and also during the portion of time M.

The timing chart 320 illustrates an exemplary embodiment of the invention. This timing chart also shows a signal to deactivate the digital processing part by not supplying the clock signal. For each of the time slots $R_0$, $R_1$, $R_2$, $T_4$, $T_5$, the digital processing part is only deactivated during a period corresponding to only a part of this time slot. The digital processing part thus operates normally during the rest of the time slot $R_0$, $R_1$, $R_2$, $T_4$, $T_5$.

This period during which the digital processing part is deactivated can possibly be adjusted. In FIG. 2, double arrows represent the parts $P_0$, $P_0'$, $P_1$, $P_1'$, $P_2$, $P_2'$, $P_4$, $P_4'$, $P_5$, $P_5'$ of the slots during which the moment of changing from the first mode to the second mode, and the reverse, can be chosen.

In addition, the digital processing part is allowed to operate normally during the portion of time M. If the quality of the transmission is sufficient, it is possible to do without analyzing the results from this monitoring or to tolerate the error related to the interference generated by the digital processing part. To return to FIG. 1, the processor 140 comprises a resource management unit 141 comprising deactivation means for isolating the clock 143 from the digital processing part 142, for example by modifying the value of a mode bit not represented. In this manner, the device 141 manages the non-supplying of a clock signal to the part 142.

The deactivation or slowing can be done by other means, for example by modifying the value of a mode bit in order to change to inactive mode, particularly if the part 142 is asynchronous.

For each time slot, the device 141 is programmed to deactivate this part 142 during only a part of the time slot, such that the digital processing part operates normally during the rest of the slot. The device 141 can have been programmed with a computer program comprising instructions for modifying a value of a mode bit at a given moment inside a time slot. The beginning and end moments of the time slot are known after synchronization.

Figure 3:
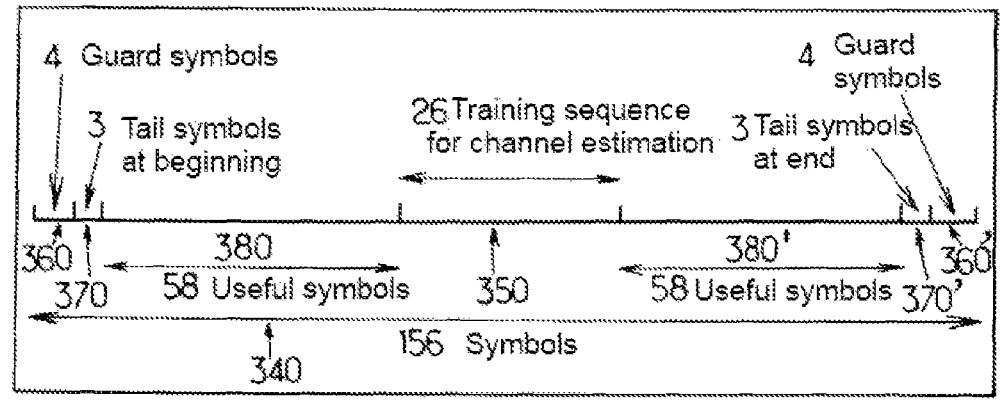
FIG. 3 shows a timing chart representing the different intervals of time for an exemplary time slot.

FIG. 3 shows a timing chart representing the different intervals of time for an exemplary time slot 340. This time slot 340 allows receiving or sending a burst of a duration of 624 Qb, where $$Qb = \frac{12}{13.10^{-6}}$$

seconds, which corresponds to 156 symbols.

The slot 340 comprises two intervals of time 360, 360' intended for the transmission or reception of guard symbols, at the beginning and end of the burst. Each time interval 360, 360' corresponds to the transmission or reception of four guard symbols.

The slot 340 additionally comprises two intervals of time 370, 370' intended for the transmission or reception of respective beginning and end tail symbols.

The slot 340 additionally comprises two intervals of time 380, 380' intended for the transmission or reception of useful symbols. These two intervals of time are separated by an interval of time 350 intended for transmitting a training sequence for channel estimation.

For example, one can choose to allow the part 142 in FIG. 1 to operate normally during the intervals of time 360, 360', since these correspond to the transmission/reception of guard symbols. When there are several slots in succession, the interval 360' is adjacent to the interval 360 of the next slot. As these intervals 360, 360' correspond to four symbols, the part 142 can then operate normally during a period corresponding to eight symbols.

If one chooses to allow the part 142 to operate normally during the intervals of time 370, 370' as well, the part 142 can then operate normally for a period corresponding to fourteen symbols.

Figure 4:
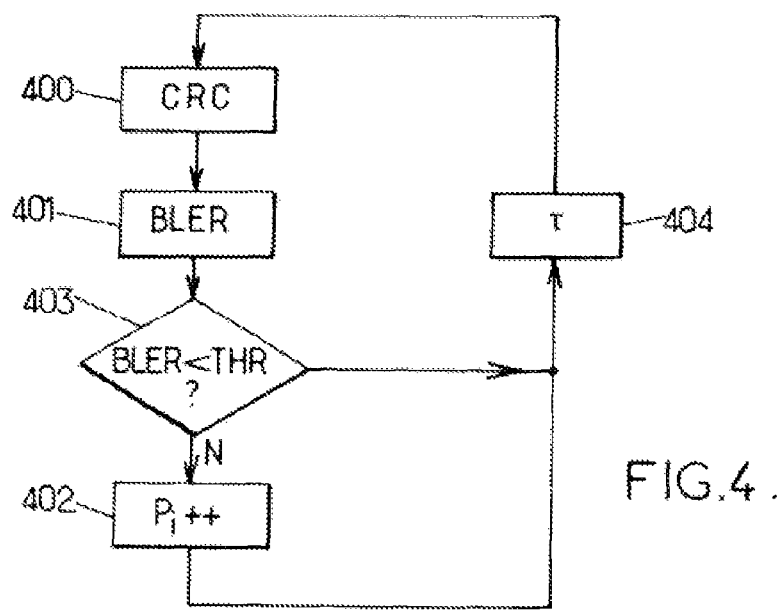
FIG. 4 is a flow chart of an exemplary process for choosing the moments for changing from one mode to the other, according to an embodiment of the invention.

FIG. 4 is a flow chart of an exemplary algorithm of a process for choosing the moments for changing from the first mode to the second mode, and from the second mode to the first mode.

During the service life of a mobile telephone terminal, a cyclic redundancy check is performed during a step 400. This step is conducted using redundancy bits introduced in the channel coding, according to a process well known to those skilled in the art.

A block error rate BLER is then calculated in a step 401, as a function of the results of the cyclic redundancy check. This provides a measurement of a transmission or reception quality parameter.

Alternatively, a SNR can be measured using a known sequence of symbols.

This value is compared to a threshold during a step 403: if the BLER is too high, then for each slot $R_i$ or $T_j$, the duration of a time slot adjustment part $P_i$ is increased during a step 402, such that the period with the least interference sees its length increase. The digital processing part is thus deactivated longer, in a manner that globally decreases the interference on the symbols transmitted or received.

For each time slot, one or more period(s) of normal operation is(are) defined in a manner that fills the time in the slot not filled by the first period(s) of less interference.

These steps 400, 401, 403, 402 can be repeated at regular intervals. The algorithm includes a wait step 404 for this purpose, between two measurement steps 400.

What is claimed is:

1. A mobile telephone terminal, comprising:
    a radio transceiver operative to transmit and receive bursts of radio frequency signals, and further operative to receive a value for at least one measured transmission or reception quality parameter;
    a synchronization circuit arranged to provide allocated time slots, with each time slot allocated for the transmission or reception of radio frequency signals corresponding to a burst;
    at least one device able to operate in a first mode and in a second mode, said at least one device interfering less with the transmission or reception of radio frequency signals when it is in the first mode than when it is in the second mode; and
    a resource management circuit operative to cause said at least one device to change from one of the first and second modes to the other of the first and second modes during a first allocated time slot at a moment within the first time slot that is not coincident with the beginning or end of the first time slot, the moment chosen as a function of said at least one received value, such that the device operates in the first, less interfering mode during only a part of the time slot, and for a duration determined by the at least one received value.

2. The mobile telephone terminal of claim 1, wherein said at least one time slot is divided into predefined intervals of time, and the moment of changing from one of the first and second modes to the other of the first and second modes is chosen such that said at least one device operates in the second mode during a period of time comprising at least one of said intervals of time.

3. The mobile telephone terminal of claim 2, wherein the period of time during which said at least one device operates in the second mode comprises an interval of time, within the first time slot, intended for the transmission or reception of guard symbols at the beginning or end of the burst of symbols corresponding to the time slot.

4. The mobile telephone terminal of claim 2, wherein the period of time during which said at least one device operates in the second mode comprises at least a portion of an interval of time, within the first time slot, intended for the transmission or reception of useful symbols.

5. The mobile telephone terminal according to claim 1, wherein, in order to cause said at least one device to change from the second mode to the first mode, said resource management circuit comprises a circuit selected from the group consisting of a circuit operative to cut off a clock signal intended for at least one device, a circuit operative to modify a clock frequency of at least one device, a circuit operative to cut off or modify a power source for at least one device, a circuit operative to modify a voltage to at least one device, and a spread spectrum circuit for at least one device.

6. The mobile telephone terminal of claim 1, wherein the mobile telephone terminal is adapted to use a Time Division Multiple Access (TDMA) scheme.

7. The mobile telephone terminal of claim 1, wherein the resource management circuit is operative to cause said at least one device to change from one of the first and second modes to the other of the first and second modes during the transmission or reception of a first burst by the radio transceiver.

8. A method of managing resources of a mobile telephone terminal, said terminal comprising a radio transceiver operative to transmit and receive bursts of radio frequency signals and further operative to receive a value for at least one measured transmission or reception quality parameter, a synchronization circuit arranged to provide allocated time slots with each time slot allocated for the transmission or reception of radio frequency signals corresponding to a burst, and at least one device able to operate in a first mode and in a second mode, said at least one device interfering less with the transmission or reception of radio frequency signals when it is in the first mode than when it is in the second mode, the method comprising:
    during a first time slot, causing said at least one device to change from one of the first and second modes to the other of the first and second modes at a moment within the first time slot that is not coincident with the beginning or end of the first time slot, the moment chosen as a function of said at least one received value, such that the device operates in the first, less interfering mode during only a part of the time slot, and for a duration determined by the at least one received value.

9. The method of claim 8, wherein the first time slot is divided into predefined intervals of time, and the moment of changing from one of the first and second modes to the other of the first and second modes is chosen such that said at least one device operates in the second mode during a period of time comprising at least one of said intervals of time.

10. The method of claim 9, wherein the period of time during which said at least one device operates in the second mode comprises an interval of time, within the first time slot, intended for the transmission or reception of guard symbols at the beginning or end of the burst of symbols corresponding to the time slot.

11. The method of claim 9, wherein the period of time during which said at least one device operates in the second mode comprises at least a portion of an interval of time, within the first time slot, intended for the transmission or reception of useful symbols.

12. The method of claim 8, wherein the changing of the at least one device from the second mode to the first mode is caused by an action selected from the group consisting of cutting off a clock signal intended for at least one device, modifying a clock frequency of at least one device, cutting off or modifying a power source for at least one device, modifying a voltage to at least one device, and a spreading the spectrum for at least one device.

13. The method of claim 8, wherein the changing of the at least one device from one of the first and second modes to the other of the first and second modes is allowed to be caused said during the transmission or reception of a first burst by the radio transceiver.

14. The method of claim 8 wherein the mobile telephone terminal uses a Time Division Multiple Access (TDMA) scheme.

15. A non-transient computer readable media storing program instructions operative to manage resources of a mobile telephone terminal comprising a radio transceiver operative to transmit and receive bursts of radio frequency signals and further operative to receive a value for at least one measured transmission or reception quality parameter, a synchronization circuit arranged to provide allocated time slots with each time slot allocated for the transmission or reception of radio frequency signals corresponding to a burst, and at least one device able to operate in a first mode and in a second mode, said at least one device interfering less with the transmission or reception of radio frequency signals when it is in the first mode than when it is in the second mode, the program instructions operative to cause a controller to during a first time slot, cause said at least one device to change from one of the first and second modes to the other of the first and second modes at a moment within the first time slot that is not coincident with the beginning or end of the first time slot, the moment chosen as a function of said at least one received value, such that the device operates in the first, less interfering mode during only a part of the time slot, and for a duration determined by the at least one received value.

\* \* \* \* \*